Feb. 18, 1936. E. A. JOHNSTON 2,031,317
TRACTOR
Filed Feb. 23, 1933 5 Sheets-Sheet 1
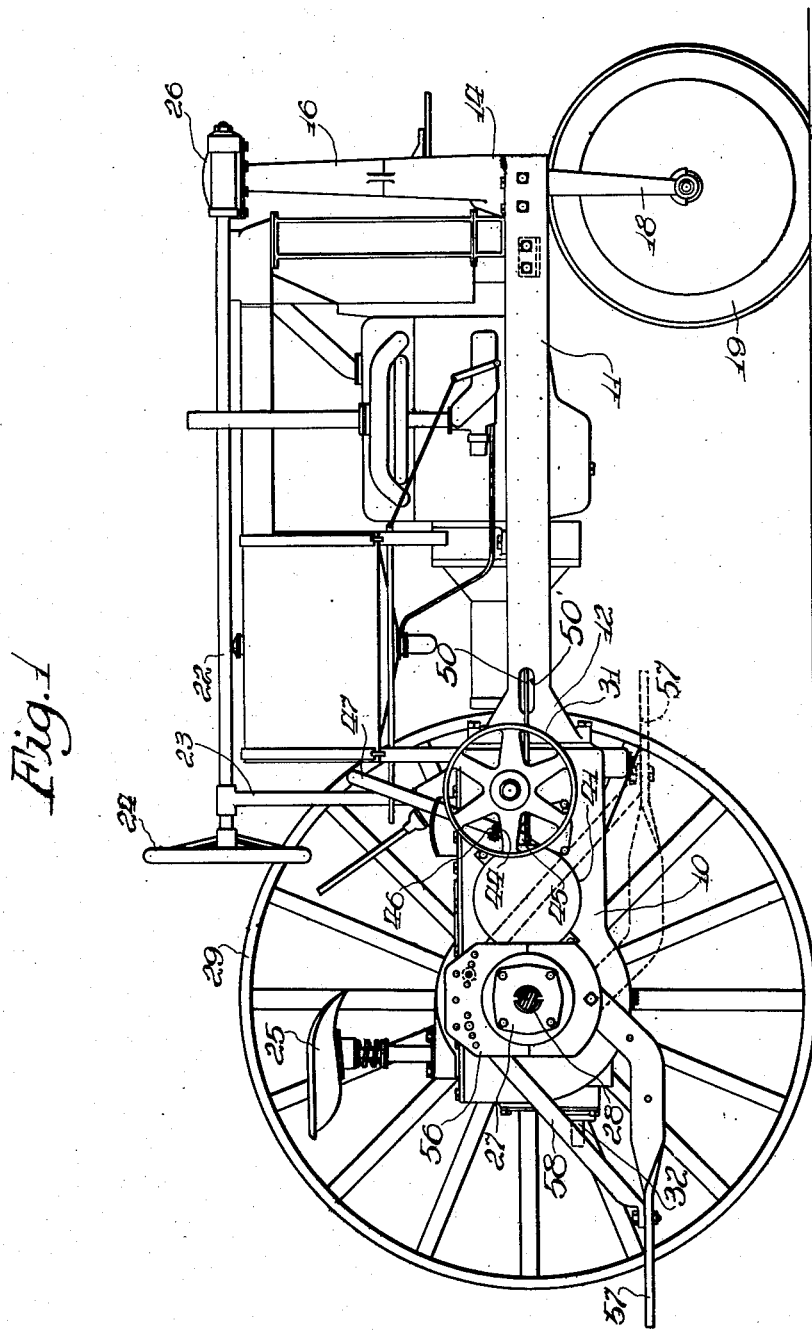
Inventor
Edward A. Johnston
By [signature] Atty Feb. 18, 1936.  E. A. JOHNSTON  2,031,317
TRACTOR
Filed Feb. 23, 1933   5 Sheets-Sheet 2
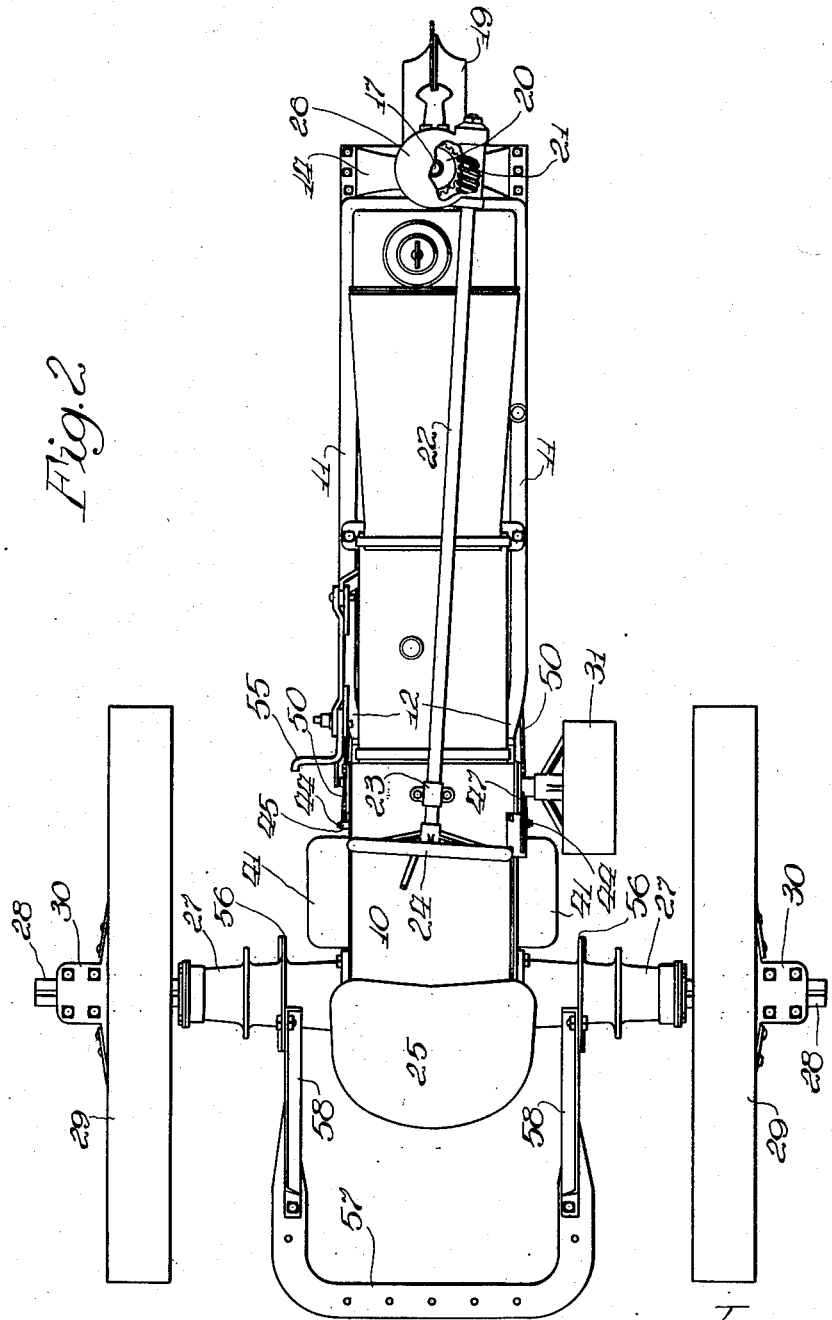

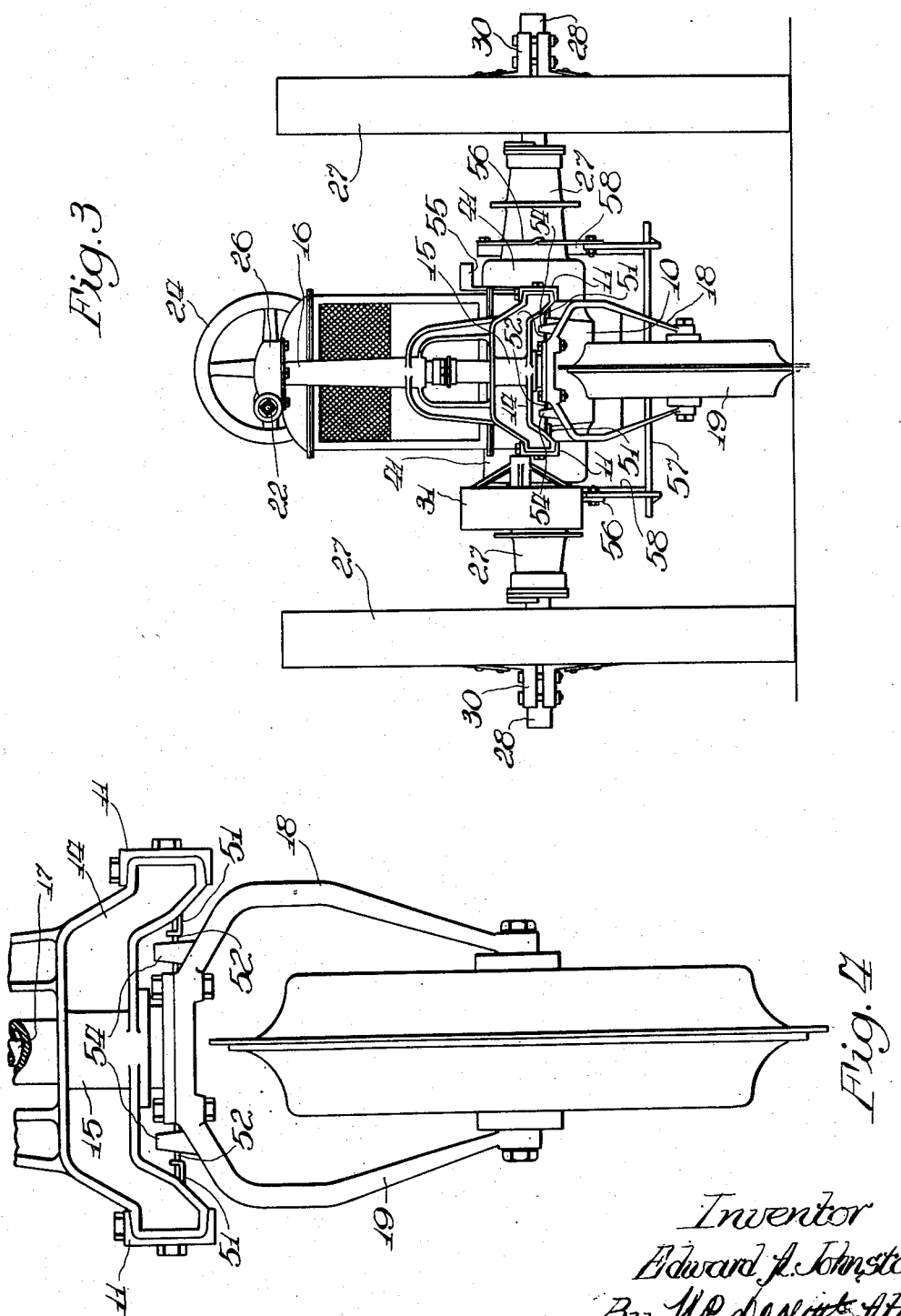

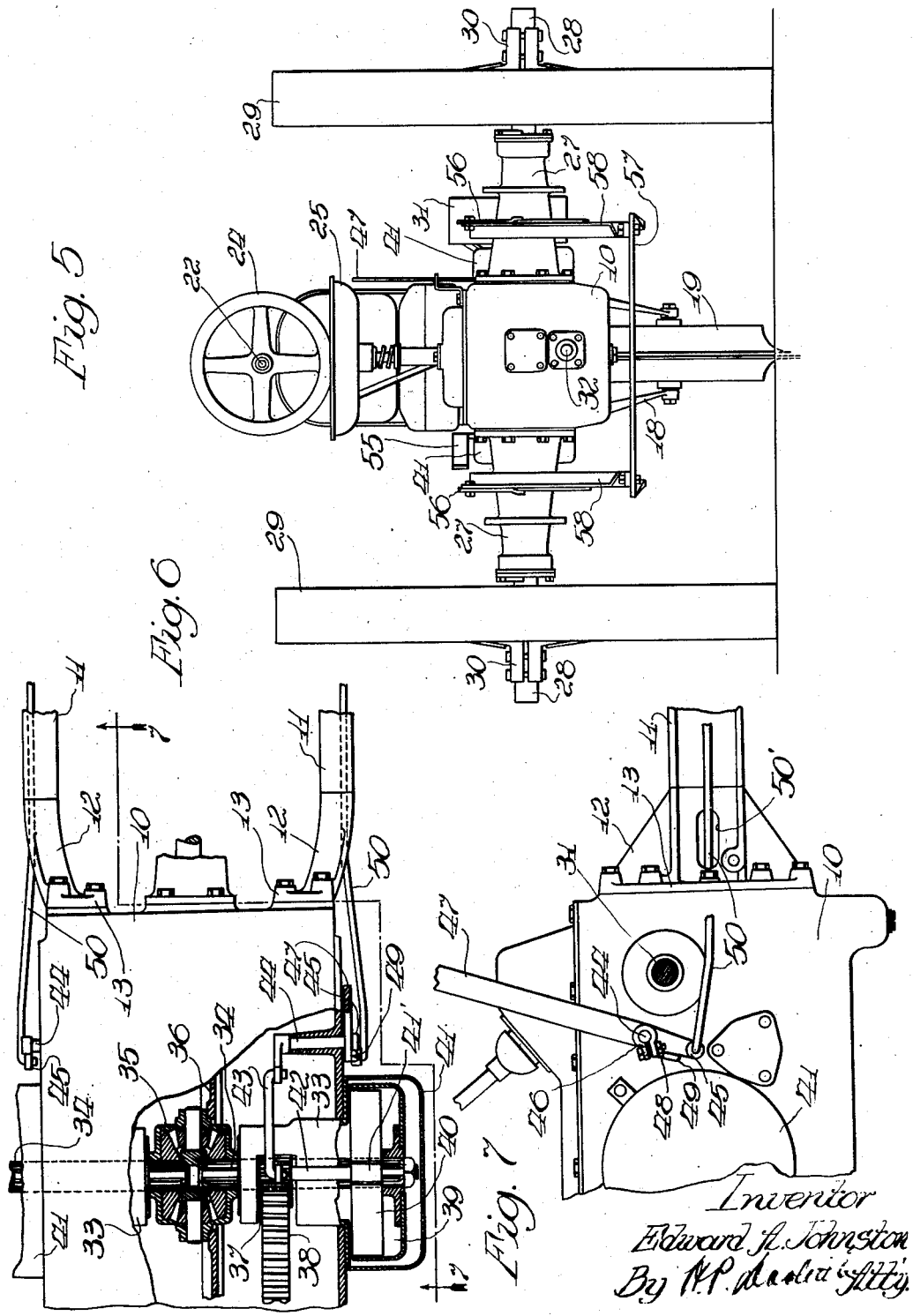

Feb. 18, 1936.　　　E. A. JOHNSTON　　　2,031,317
TRACTOR
Filed Feb. 23, 1933　　　5 Sheets-Sheet 5

Inventor
Edward A. Johnston
By

Patented Feb. 18, 1936

2,031,317

UNITED STATES PATENT OFFICE 2,031,317

TRACTOR

Edward A. Johnston, Chicago, Ill., assignor to International Harvester Company, a corporation of New Jersey Application February 23, 1933, Serial No. 658,121

5 Claims. (Cl. 180—18)

The present invention relates to tractor construction and in particular to improvements in the structure of farm tractors of the row crop or general purpose type.

The main purpose of the invention is to provide a light, simple structure for a tractor of the type stated having provision for automatic braking of one of the differentially driven axles when making short turns and one in which the mechanisms of the power transmission line and principal parts of the brake applying means are contained within the structure of the tractor body, thus affording a compact body structure well adapted for connection of various farm implements at the sides or rear thereof as required in the use of tractors of this type.

This purpose as well as other objects and advantages that will become evident from the detailed description hereinafter given is accomplished by providing a novel form of combined frame and housing construction for the body and wide tread rear axle of the tractor, which structure includes provisions for housing and supporting the moving parts of the brake mechanism and of the power plant and driving parts of the tractor wheels and power take-off shafts of the tractor.

The preferred structure is illustrated by the accompanying drawings, where:

Figure 1 is a side elevation of the tractor with a traction wheel omitted for better showing of the rear part of the tractor body;

Figure 2 is a plan view;

Figure 3 is a front elevation;

Figure 4 is an enlarged detail view of the steering truck seen in Figure 3;

Figure 5 is a rear elevation;

Figure 6 is an enlarged detail view, partly broken away, in plan, of the rear portion of the tractor body;

Figure 7 is a side view of the structure seen in Figure 6 with parts sectioned on the line 7—7 of that figure; and, Figure 8 is a perspective view of the brake applying mechanism shown apart from the tractor body.

Figure 8:
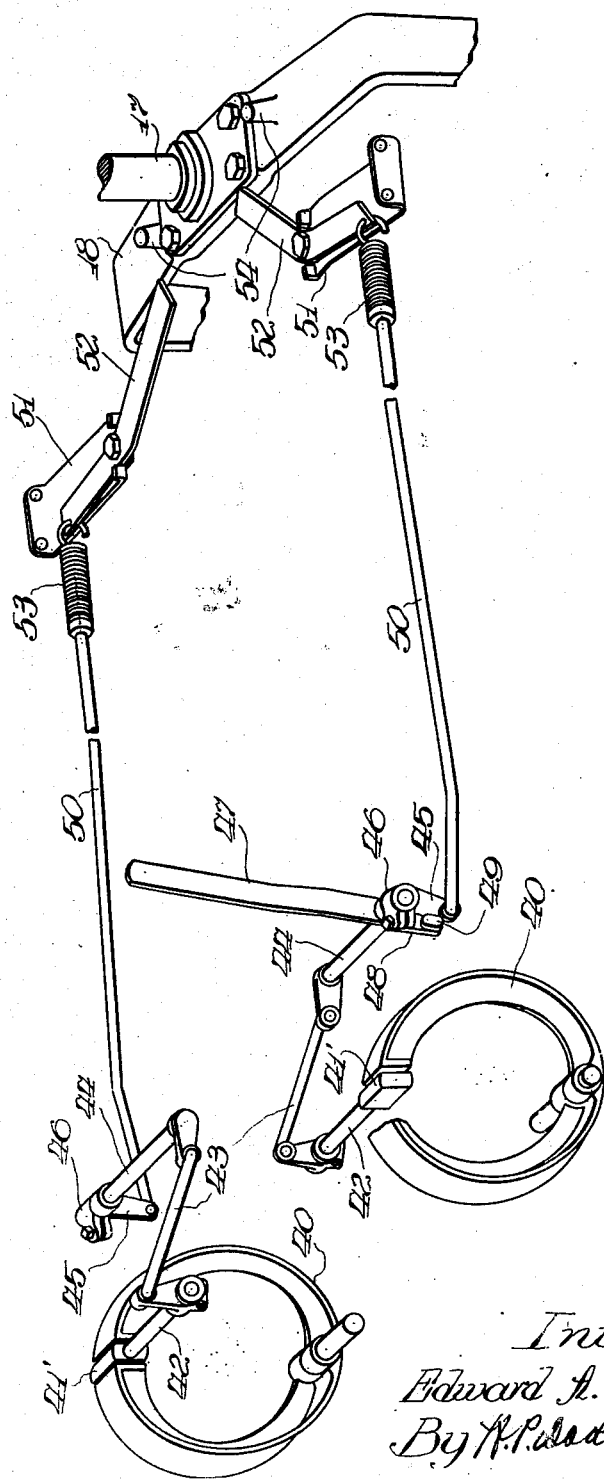

In the specific embodiment of the invention herein disclosed, the tractor is constructed with a body comprising an oblong, quadrilateral, or box-like, casing 10 forming the rear portion of the body, with its longer diameter extending longitudinally thereof, and forwardly extending channel members 11 secured to the forward face of the casing. The channel members 11, which form side sills for the body, have their flanges extending inwardly and are formed with flared, inwardly bowed, rear ends 12 flattened to form securing flanges, or heads, 13 (Figure 6), which are bolted or otherwise secured to the casing. The bow at the ends 12 is made sufficient to place the outer sides of the channel members 11 a little outwardly of the sides of the casing 10.

The forward ends of the side sills or members 11 are secured to a front bolster 14 formed with a central vertical cylindrical bore at 15, which bolster has an upward extension formed with an upright tubular post 16 in alignment with the bore 15. The bore 15 and post 16 contain bearings for the vertical shaft 17 of a dirigible truck composed of the arched wheel frame 18 removably secured to the lower end of the shaft 17 and the steering wheel 19 journaled on an axle joining the lower ends of the outwardly bowed arms of the wheel frame, as best seen in Figures 3 and 4. As shown on Figure 2, the upper end of the shaft 17 has fixed to it a worm wheel 20 in mesh with a worm pinion 21 on the forward end of a steering shaft 22 extending towards the rear of the tractor where it is supported on a standard 23 and provided with a steering wheel 24 in convenient position with respect to the seat 25. The tractor power plant comprising the usual engine, radiator fuel tank, etc. constituting the forward portion of the tractor body, is supported on and between the side sills 11, and the steering shaft 22 extends above these, as shown. A suitable housing 26 secured on the upper end of the post 16 encloses the worm wheel 20 and worm pinion 21 and provides bearings for the forward end of the steering shaft 22. Rotation of the steering shaft will transmit steering movements to the truck as is obvious.

At its rear portion, the oblong casing 10 forming the rear portion of the tractor body has secured to it on each side, the tubular axle housings 27 containing the bearings for the differentially driven axle shafts 28 which extend beyond the ends of the housings. The projecting ends of the axle shafts 28 carry the traction wheels 29 which are adjustably clamped on the shafts, as by means of split hubs 30, to provide for variations in tread width.

The casing 10 encloses the change speed transmission, differential drive to the axle shafts, drive connection for the shaft and belt pulley 31, drive connection for a rearwardly projecting power take-off shaft 32, and brake applying mechanism for the differentially driven axle shafts, but, aside from the brake applying mechanism, these are not specifically parts of the present invention and form the subject-matter of a co-pending application Serial No. 658,122 filed Feb. 23, 1933, and patented as No. 1,982,436, November 27, 1934. Only so much thereof as is necessary to an understanding of the present invention will, accordingly, be described and illustrated.

Just forward of the axle housings 27, the side walls of the casing 10 are formed with openings for the reception of bearing boxes 33 (Figure 6) carrying drive shafts 34, which shafts are connected by and driven through a differential 35. The differential includes a ring gear shown in section at 36, which is driven from the transmission contained in the forward portion of the casing (not shown). Each shaft 34 is connected to an axle shaft by a spur pinion 37 in mesh with a bull gear 38 on each axle shaft. The differential drive shafts 34 project beyond the sides of the casing 10, as illustrated, and the projecting ends have brake drums 39 fixed thereon, which cooperate with internal brake shoes 40 of conventional type. Cap housings 41, suitably secured to the casing 10, completely cover and seal the brake drums and exclude dust, water and dirt from the brakes and casing. The brake shoes are expanded by the cams 41' on rockshafts 42 journaled in a bearing on the upper side of the bearing boxes 33. The rockshafts 42 are connected by links 43 with parallel rockshafts 44 located forwardly of the rockshafts 42 and journaled in bearing bosses on the side walls of the casing 10. The outer ends of shafts 44 project outside the casing walls sufficiently to permit depending crank arms 45 to be clamped on the ends, as by the split clamp sleeves 46, and allow space between sleeves 46 and the casing wall for mounting a hand lever 47 rotatably on the shaft. This hand lever is an auxiliary means for applying the brake at that side and in the present instance only one of the brake shafts 44 is shown so equipped, though both may be. This lever is provided with a short arm 48 extending below its pivot on the shaft 44, which arm has a lateral lug 49 positioned to contact with the rear edge of the crank arm 45 forming a lost motion connection therewith. With this arrangement, the hand lever 47 can be used to rock the shaft 44 to apply the brake, but the arm 45 may be rocked forwardly independently of the hand lever.

The brake mechanism of the tractor is primarily under control of the steering mechanism for making short turns, and, to effect this, each crank arm 45 is connected to a brake rod 50 extending forwardly through a suitable opening 50' in the outwardly bowed rear portion 12 of each channel member 11 and along the inner sides of those members. As best seen on Figure 8, the forward ends of the side sills or channel members 11, just back of the front bolster 14, have inwardly extending bracket arms 51 secured thereto, on which horizontal angular levers 52 are pivoted intermediate their ends with the inner arms thereof positioned within the range of the angular movement of the steering truck. The forward ends of the brake rods 50 carry coil springs 53 connected to the outer arms of the levers. Near the upper ends thereof the arms of the truck frame 18 are provided with upright lugs 54 at each side of the truck shaft and these lugs are positioned to engage the inner ends of the levers 52 alternately after predetermined steering, or angular, movement of the steering truck in each direction thus forming a lost motion connection. When this contact or engagement occurs, the lever 52 will be swung on its pivot and the spring 53 put under tension, thereby exerting a pull on a brake rod 50 and causing application of the brake on the side towards which the turn is being made. The braking force applied to a differential shaft 37 will, of course, retard or stop rotation of the associated axle shaft and cause the tractor to pivot about the traction wheel on that shaft.

The tractor has the usual clutch pedal at 55 and the axle housings 27 are formed with radial flanges to which draft plates or members 56 for a drawbar 57 and its supporting arms 58 are secured. The upper part of the plates 56 are preferably formed with two series of bolt openings to permit reversal of the drawbar and braces in the manner illustrated in broken lines on Figure 1, as is desirable in connection with the coupling of different types of implements to the rear portion of the tractor, some of which may require additional bolt holes in the plates 56, as illustrated at the upper edge thereof. This draft frame structure forms the subject-matter of a co-pending application Serial No. 739,006 filed Aug. 8, 1934.

The combined casing and channel member structure of the tractor body affords a light, but rigid, structure within which practically all of the moving parts of the power transmission line and short turning gear are contained, and, as the brake rods are housed in the channel members, the sides of the tractor body are left clear of any parts likely to interfere with the mountings for side connected implements such as used on general purpose tractors of the so-called tricycle type.

What is claimed is:

1. A tractor comprising a body having an oblong casing at the rear with its longer diameter extending fore and aft, the opposite lateral sides of said casing being substantially flat, axle shafts mounted in the casing, differentially driven shafts mounted in the casing forward of the axle shafts with the outer ends thereof extending beyond the sides of the casing, a driving connection between the differential and axle shafts within the casing, a brake mounted on the end of each differential shaft outside the casing, a cap housing covering each brake, actuating mechanism for each brake inclosed within the casing and cap housing including a rockshaft having one end projecting from the side of the casing forward of the cap housing, and means connected to the projecting end of each rockshaft for rocking same to actuate the brakes separately.

2. A tractor comprising a body having a casing at the rear thereof, side sills secured to and extending forwardly from the casing, differentially driven axle shafts and means for applying a brake to each shaft mounted within the casing, a dirigible truck supporting the forward ends of said sills, means on the tractor for steering the truck, a brake link connected to each brake applying means and extending forwardly along the inner side of each side sill, an inwardly extending bracket arm secured to the inner side of each sill near the forward end thereof, a lever pivoted between its ends on each bracket arm to swing in a horizontal plane, a coil spring on the forward end of each link connected to one end of each lever, and vertical abutments on the truck positioned to engage the other ends of the levers alternately after a predetermined steering movement of the truck in each direction to brake the differential shaft on the side towards which the tractor is steered.

3. A tractor comprising a body having a casing at the rear thereof, side sills secured to and extending forwardly from the casing, a front bolster to which the forward ends of the side sills are connected, a steering shaft mounted within said bolster, differentially driven drive shafts in the casing, brake drums mounted on said shafts at each outer side of the casing, brake shoes supported from said casing for applying pressure to said drums, a steering truck attached to the aforesaid steering shaft, brake links extending forwardly between the side sills for actuating each brake, a brake applying lever pivoted on each side sill adjacent the steering truck, one arm of each lever being connected to a brake link, laterally positioned abutments on said steering truck positioned to be normally spaced from the other arms of said levers whereby a lost motion connection is had between said steering truck and the aforesaid brake levers to engage the brake levers alternately after a predetermined steering movement of the steering truck in each direction.

4. In the structure as set forth in claim 3, laterally spaced rock-shafts pivotally mounted in said casing, crank portions on the inner and outer ends of each said rock-shafts, the outer crank portions being outside the casing and connected to the aforesaid brake links, additional laterally spaced rock-shafts within the casing for operating said brake shoes having crank portions on the inner ends thereof, and links pivotally connecting the inner cranks of the pairs of laterally spaced rock-shafts whereby the brakes are applied to the aforesaid drive shafts through mechanism within the casing.

5. In the structure as set forth in claim 3, laterally spaced rock-shafts pivotally mounted in said casings, crank portions on the inner and outer ends of each of said rock-shafts, the outer crank portions being outside the casing and connected to the aforesaid brake links, means for connecting said rock-shafts to the aforesaid brake shoes, a hand lever pivotally mounted on one of the aforesaid rock-shafts adjacent its outer crank portion, and a lost motion connection between the hand lever and the crank portion of said rock-shaft whereby the brake may be set by hand, or be operated by the aforesaid steering truck.

EDWARD A. JOHNSTON.